(12) United States Patent
Gordon et al.

(10) Patent No.: US 9,855,809 B2
(45) Date of Patent: Jan. 2, 2018

(54) UNIVERSAL WISHBONE TRAILING ARM

(71) Applicants: Robby Gordon, Charlotte, NC (US); Mike Niemiec, Charlotte, NC (US)

(72) Inventors: Robby Gordon, Charlotte, NC (US); Mike Niemiec, Charlotte, NC (US)

( * ) Notice: Subject to any disclaimer, the term of this patent is extended or adjusted under 35 U.S.C. 154(b) by 0 days.

(21) Appl. No.: 15/242,320

(22) Filed: Aug. 19, 2016

(65) Prior Publication Data
US 2017/0050483 A1  Feb. 23, 2017

Related U.S. Application Data

(60) Provisional application No. 62/208,531, filed on Aug. 21, 2015.

(51) Int. Cl.
*B60G 7/00* (2006.01)
*B60G 3/08* (2006.01)
*B60G 3/14* (2006.01)

(52) U.S. Cl.
CPC .............. *B60G 7/001* (2013.01); *B60G 3/08* (2013.01); *B60G 3/145* (2013.01); *B60G 2200/1322* (2013.01); *B60G 2200/4622* (2013.01); *B60G 2204/416* (2013.01); *B60G 2206/124* (2013.01)

(58) Field of Classification Search
CPC .......... B60G 7/001; B60G 3/08; B60G 3/145; B60G 2200/1322; B60G 2200/4622; B60G 2206/124
See application file for complete search history.

(56) References Cited

U.S. PATENT DOCUMENTS

| | | | | |
|---|---|---|---|---|
| 4,424,984 A * | 1/1984 | Shiratori | ................. | B60G 7/00 280/86.753 |
| 4,695,073 A * | 9/1987 | Pettibone | ............... | B62D 17/00 280/124.128 |
| 4,706,989 A * | 11/1987 | Iijima | .................... | B60G 7/006 180/414 |
| 5,836,599 A * | 11/1998 | Rein de Vlugt | ......... | B60G 3/14 280/124.116 |
| 7,980,576 B2 * | 7/2011 | Inoue | ..................... | B60G 7/001 280/124.121 |
| 8,210,551 B2 * | 7/2012 | Jakob | .................... | B60G 3/145 280/124.116 |

(Continued)

*Primary Examiner* — Faye M Fleming
(74) *Attorney, Agent, or Firm* — Rutan & Tucker LLP; Hani Z. Sayed

(57) ABSTRACT

A universal wishbone trailing arm and methods are provided for coupling a wheel to a vehicle chassis. The universal wishbone trailing arm comprises a wheel hub that fastenably receives the wheel. A cylindrical axle support supports one or more roller bearings whereby the wheel hub is rotatable. A first swing arm and a second swing arm extend forwardly from a joined swing arm. The cylindrical axle support is coupled to a rear of the joined swing arm. A first chassis mount hingedly couples the first swing arm to the vehicle chassis. A second chassis mount hingedly couples the second swing arm to an articulated mount which is configured to couple the second swing arm to the vehicle chassis. The articulated mount cooperates with the first second swing arms to change the camber of the wheel, such that a tracking of the wheels remains substantially unchanged during traveling over rough terrain.

19 Claims, 8 Drawing Sheets

(56) References Cited

U.S. PATENT DOCUMENTS

| | | | | |
|---|---|---|---|---|
| 8,720,920 B2* | 5/2014 | Williams | ............... | B21D 19/08 16/2.2 |
| 2015/0224843 A1* | 8/2015 | Luttinen | ................. | B60G 3/04 280/86.753 |
| 2017/0050673 A1* | 2/2017 | Gordon | ................. | B62D 17/00 |

* cited by examiner

UNIVERSAL WISHBONE TRAILING ARM

PRIORITY

This application claims the benefit of and priority to U.S. Provisional Application, entitled "Universal Wishbone Trailing Arm," filed on Aug. 21, 2015 having application Ser. No. 62/208,531.

FIELD

The field of the present disclosure generally relates to vehicle suspension systems. More particularly, the field of the invention relates to a universal wishbone trailing arm for off-road vehicle suspension systems.

BACKGROUND

Trailing arm suspensions are well known and commonly used in heavy-duty vehicles, such as semi tractor-trailer configurations, as well as off-road vehicles such as four-wheeled buggies. A typical trailing arm suspension comprises a trailing arm having one end pivotally connected to a vehicle frame through a frame bracket and another end connected to the vehicle frame by a spring or strut. The trailing arm supports an axle to which the vehicle wheels are mounted. Road-induced reaction forces acting on the wheels are controlled by the pivoting of the trailing arm in response to these forces, with the forces being resisted by the spring.

Given that off-road vehicles routinely travel over very rough terrain, such as mountainous regions, there is a desire to improve the mechanical strength and performance of off-road suspension systems, while at the same reducing the mechanical complexity of such suspension systems.

SUMMARY

An apparatus and methods are provided for a universal wishbone trailing arm for coupling a wheel to a vehicle chassis. The universal wishbone trailing arm comprises a wheel hub configured to fastenably receive the wheel. A cylindrical axle support is configured to support one or more roller bearings whereby the wheel hub is rotatable. A first swing arm and a second swing arm extend forwardly from a joined swing arm. The cylindrical axle support is coupled to a rear of the joined swing arm. A first chassis mount is configured to hingedly couple the first swing arm to the vehicle chassis. A second chassis mount is configured to hingedly couple the second swing arm to an articulated mount which is configured to couple the second swing arm to the vehicle chassis. The articulated mount is configured to cooperate with the first swing arm and the second swing arm so as to change a camber angle of the wheel, such that a tracking of the wheels remains substantially unchanged during traveling over rough terrain.

In an exemplary embodiment, a universal wishbone trailing arm for coupling a wheel to a vehicle chassis comprises a wheel hub configured to fastenably receive the wheel; a cylindrical axle support including one or more roller bearings whereby the wheel hub is rotatable; a first swing arm and a second swing arm extending forwardly from a joined swing arm, the cylindrical axle support being coupled to a rear of the joined swing arm; a first chassis mount configured to hingedly couple the first swing arm to the vehicle chassis; and a second chassis mount configured to hingedly couple the second swing anti to an articulated mount configured to couple the second swing arm to the vehicle chassis.

In another exemplary embodiment, the articulated mount is configured to change a camber angle of the wheel, such that a tracking of the wheels remains substantially unchanged during traveling over rough terrain. In another exemplary embodiment, a centerline of the first and second swing arms, and a centerline of the wheel hub define a flat plane, above and below which flat plane the universal trailing arm is substantially symmetric.

In another exemplary embodiment, the universal trailing arm is configured for use with either wheel in a rear suspension of a vehicle. In another exemplary embodiment, the universal trailing arm is configured for use with either wheel in a front suspension of a vehicle. In another exemplary embodiment, the cylindrical axle support is configured to receive a constant velocity (CV) joint coupled to the wheel hub so as to communicate engine-torque to the wheel. In another exemplary embodiment, the cylindrical axle support is configured to shield the CV joint from damage due to rocks and road debris encountered during off-road driving.

In another exemplary embodiment, the first swing arm comprises a curved portion to provide clearance between the first swing arm and a sidewall width of the wheel. In another exemplary embodiment, the first and second chassis mounts are configured to allow the wheel to undergo a substantially vertical motion in response to the terrain over which the wheel is rolling while diminishing a transfer of the vertical motion to the vehicle. In another exemplary embodiment, one or more shock absorbers are coupled with the universal wishbone trailing arm so as to further diminish the vertical motion conveyed to the vehicle due to terrain. In another exemplary embodiment, the one or more shock absorbers are mounted within a recess disposed between the first and second swing arms, and along a midline of the universal wishbone trailing arm, such that substantially identical universal trailing arms may be used on a driver side and a passenger side of the vehicle.

In an exemplary embodiment, a universal wishbone trailing arm for coupling a wheel to a vehicle chassis comprises a first swing arm and a second swing arm extending forwardly from a joined swing arm; a cylindrical axle support coupled to a rear of the joined swing arm; and a wheel hub rotatably supported within the cylindrical axle support.

In another exemplary embodiment, the first swing arm is further comprised of a first chassis mount configured to hingedly couple to the vehicle chassis. In another exemplary embodiment, the second swing arm is further comprised of a second chassis mount configured to hingedly couple to an articulated mount that is coupled to the vehicle chassis. In another exemplary embodiment, the articulated mount is configured to cooperate with the first swing arm and the second swing arm so as to change a camber angle of the wheel, such that a tracking of the wheels remains substantially unchanged during traveling over rough terrain.

In an exemplary embodiment, a method for a wishbone trailing arm for coupling a wheel to a vehicle chassis comprises fabricating a swing arm comprised of a forwardly extending first swing arm and a forwardly extending second swing arm; coupling a cylindrical axle support to a rear of the swing arm; and supporting a wheel hub rotatably within the cylindrical axle support.

In another exemplary embodiment, fabricating comprises configuring a first chassis mount to hingedly couple the first swing arm to the vehicle chassis, and wherein fabricating further comprises configuring a second chassis mount to hingedly couple the second swing arm to an articulated mount that is coupled with the vehicle chassis so as to maintain a tracking of the wheels during traveling over rough terrain. In another exemplary embodiment, supporting comprises configuring the cylindrical axle support to receive a constant velocity (CV) joint that is coupled to the wheel hub so as to communicate engine-torque to the wheel, the cylindrical axle support being further configured to shield the CV joint from damage due to rocks and road debris encountered during off-road driving. In another exemplary embodiment, fabricating further comprises disposing a recess between the first swing arm and the second swing arm, the recess extending along a midline of the wishbone trailing arm, such that one or more shock absorbers may be mounted within the recess and coupled with the vehicle chassis.

BRIEF DESCRIPTION OF THE DRAWINGS

The drawings refer to embodiments of the present disclosure in which.

Figure 1:
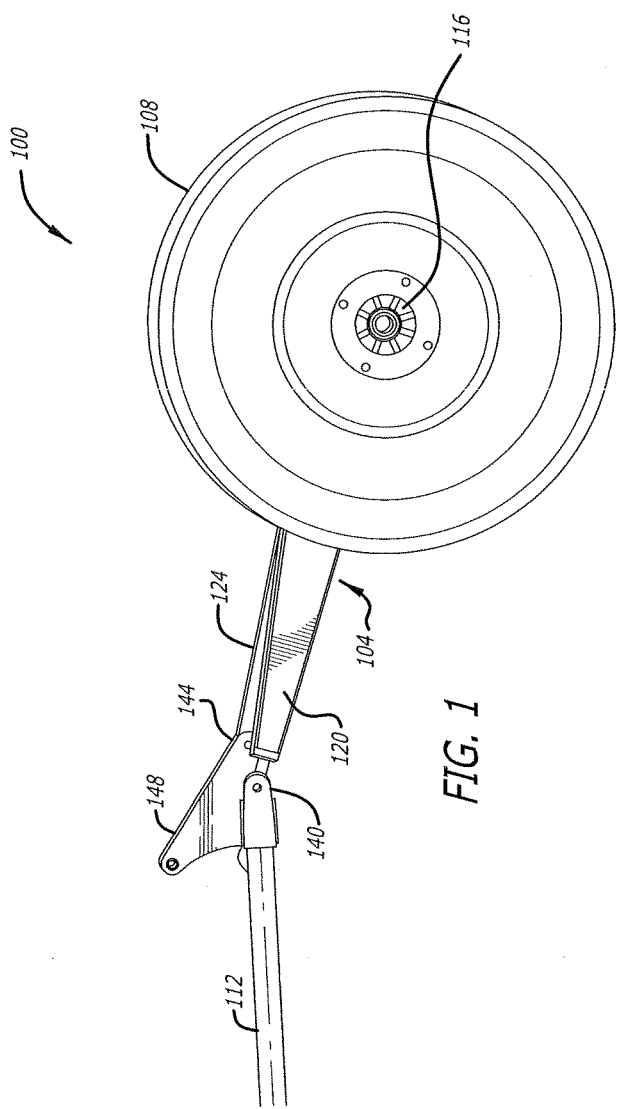
FIG. 1 illustrates an exemplary use environment wherein a universal wishbone trailing arm couples a wheel with a vehicle chassis, according to the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first trailing arm," may be made. However, the specific numeric reference should not be interpreted as a literal sequential order but rather interpreted that the "first trailing arm" is different than a "second trailing arm." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes a universal wishbone trailing arm for coupling a wheel to a vehicle chassis. The universal wishbone trailing arm comprises a wheel hub configured to fastenably receive the wheel. A cylindrical axle support is configured to support one or more roller bearings whereby the wheel hub is rotatable. A first swing arm and a second swing arm extend forwardly from a joined swing arm. The cylindrical axle support is coupled to a rear of the joined swing arm. A first chassis mount is configured to hingedly couple the first swing arm to the vehicle chassis. A second chassis mount is configured to hingedly couple the second swing arm to an articulated mount which is configured to couple the second swing arm to the vehicle chassis. The articulated mount is configured to cooperate with the first swing arm and the second swing arm so as to change a camber angle of the wheel, such that a tracking of the wheels remains substantially unchanged during traveling over rough terrain.

FIG. 1 illustrates an exemplary use environment 100 wherein a universal wishbone trailing arm 104 couples a wheel 108 to a vehicle chassis 112, according to the present disclosure. As will be recognized by those skilled in the art, the wheel 108 generally is fastened to the universal trailing arm 104 by way of a wheel hub 116. Preferably, the wheel hub 116 is rotatably attached to the universal trailing arm 104 by way of one or more suitably sized roller bearings. As will be further recognized, the wheel 108 and wheel hub 116 generally are driven by way of a constant velocity (CV) joint configured to convey torque from an engine of the vehicle.

Although the universal trailing arm 104 illustrated and described herein is best suited for use in a rear suspension of a vehicle, it is contemplated that the universal trailing arm 104 is not to be limited to rear suspensions, but rather in some embodiments, the universal trailing arm 104 may be configured for use in a front suspension of a vehicle, without limitation, and without deviating beyond the spirit and scope of the present disclosure. For the sake of brevity, however, the universal trailing arm 104 is hereinafter discussed in connection with a rear suspension of a vehicle. As such, terms conveying a relative positioning of components or portions comprising the universal trailing arm 104, such as "forward," "rearward," "back," "front," "proximal," and "distal," should not be construed as limiting in nature, but rather such terms should be understood merely as tools used to convey the details of the invention to those of ordinary skill in the art.

Figure 2:
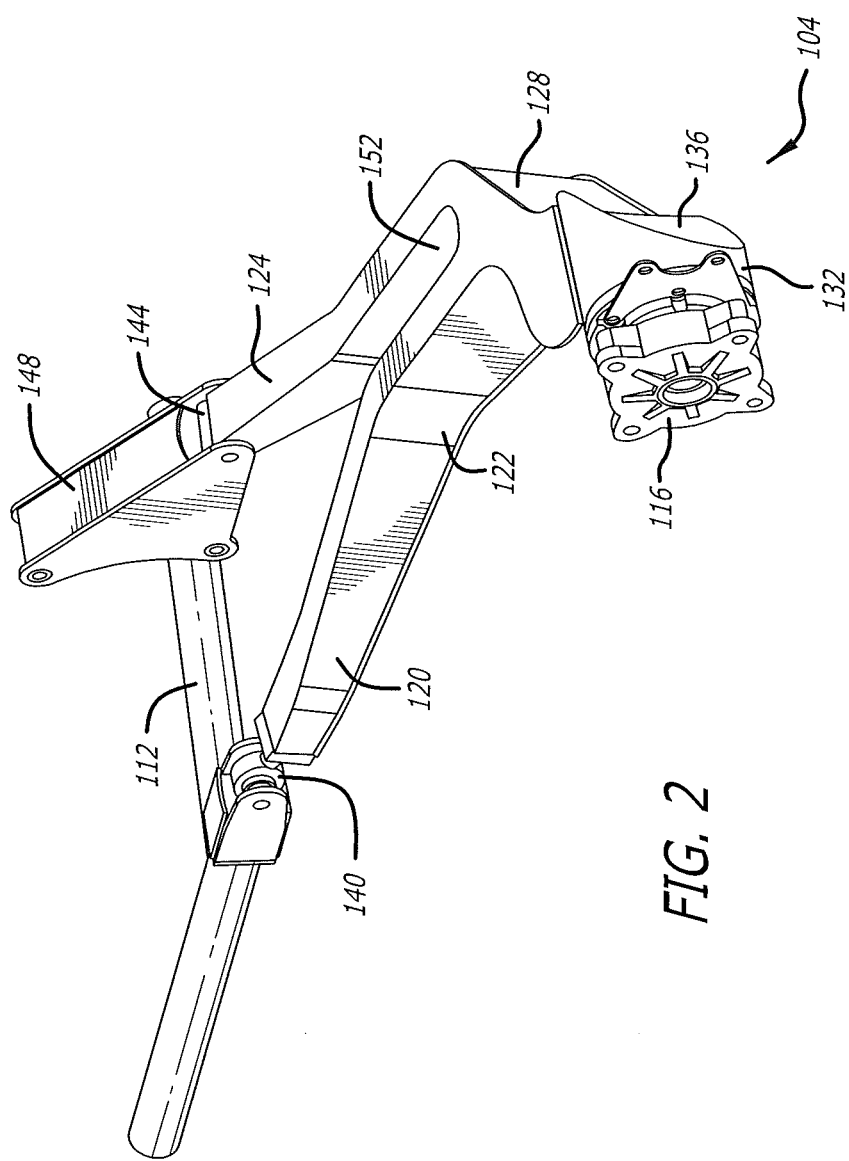
FIG. 2 is a perspective view illustrating an exemplary embodiment of a universal wishbone trailing arm coupled with a vehicle chassis in accordance with the present disclosure.
Figure 3:
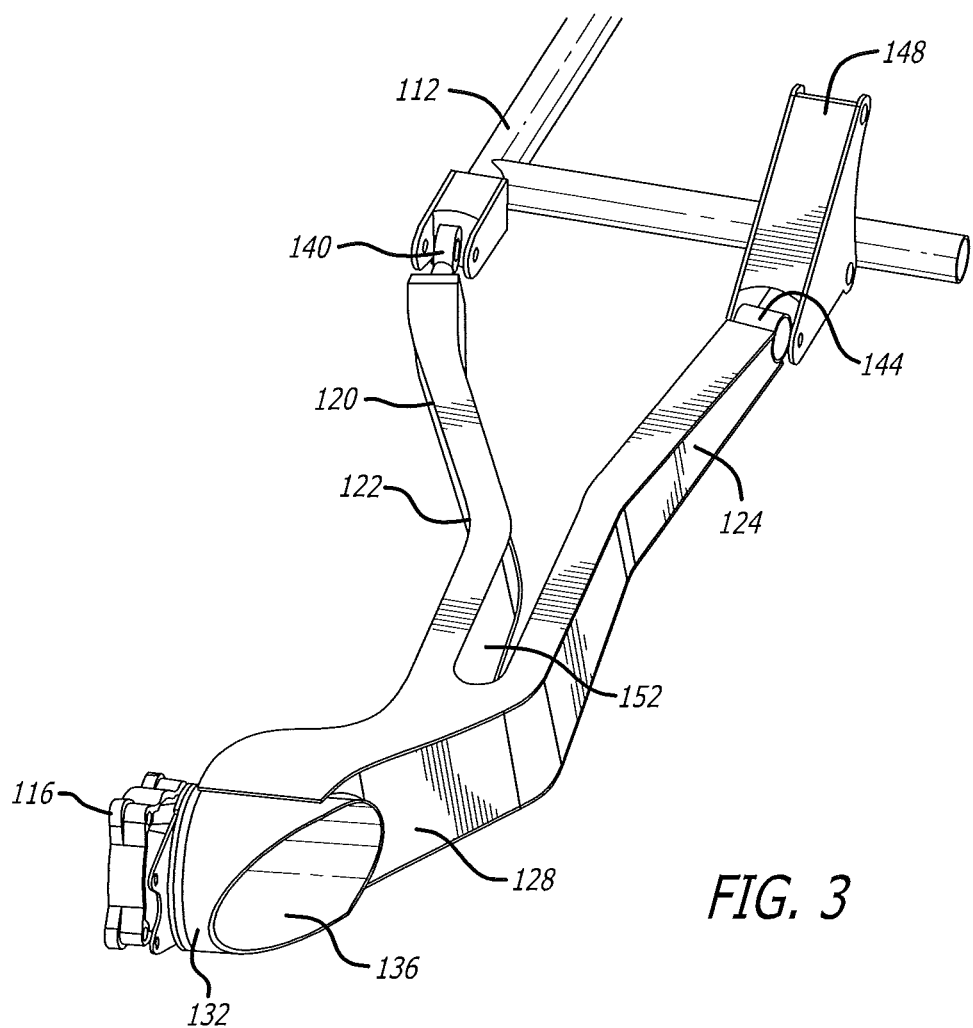
FIG. 3 is a perspective view illustrating an exemplary embodiment of a universal wishbone trailing arm coupled with a vehicle chassis, according to the present disclosure.

As best illustrated in FIGS. 2-3, the universal trailing arm 104 comprises a first swing arm 120 and a second swing arm 124 extending forwardly from a joined swing arm 128. A curved portion 122 of the first swing arm 120 provides clearance between the first swing arm and wheels 108 having a large sidewall width, as often is the case with off-road tires. At a rear-most end of the joined swing arm 128 is a cylindrical axle support 132 which couples the wheel hub 116 to the universal trailing arm 104. As will be appreciated, the cylindrical axle support 132 is configured to support the above-mentioned roller bearings whereby the wheel hub 116 is rotatable relative the universal trailing arm 104. As best shown in FIG. 3, opposite to the wheel hub 116 is an opening 136 within the cylindrical axle support 132.

The opening 136 is configured to receive the CV joint, such that the CV joint may be fastened to the wheel hub 116 so as to place the wheel hub into rotational communication with the engine. As will be appreciated, the cylindrical axle support 132 further serves as a rigid shield to protect the CV joint from damage due to rocks and road debris, particularly encountered during off-road driving.

In general, the universal trailing arm 104 may be coupled with the vehicle chassis by way of one or more chassis mounts. In the embodiments illustrated and discussed herein, a first chassis mount 140 couples the first swing arm 120 to the vehicle chassis 112. The first chassis mount 140 operates as a pivot that places the universal trailing arm 104 into a hinged relationship with the vehicle chassis. A second chassis mount 144 couples the second swing arm 124 to the vehicle chassis 112 by way of an articulated mount 148. Similarly to the first chassis mount 140, the second chassis mount 144 operates as a pivot that allows the universal trailing arm 104 to hingedly rotate relative to the vehicle chassis 112. Thus, the first and second chassis mounts 140, 144 allow the wheel 108 to undergo a substantially vertical motion according to the terrain over which the wheel is rolling while diminishing a transfer of the vertical motion to the vehicle.

In the embodiments illustrated herein, the first and second chassis mounts 140, 144 are offset at an angle relative to a perpendicular of the centerline of the vehicle chassis 112. In some embodiments, the angle ranges between 0 and 20 degrees relative to the perpendicular to the centerline of the vehicle chassis 112. It should be understood that the offset of the first and second chassis mounts 140, 144 induces a change in camber angle of the wheel 108, such that a tracking of the wheel is substantially unchanged throughout the range of vertical motion of the universal trailing arm 104 during operation of the vehicle.

Figure 4:
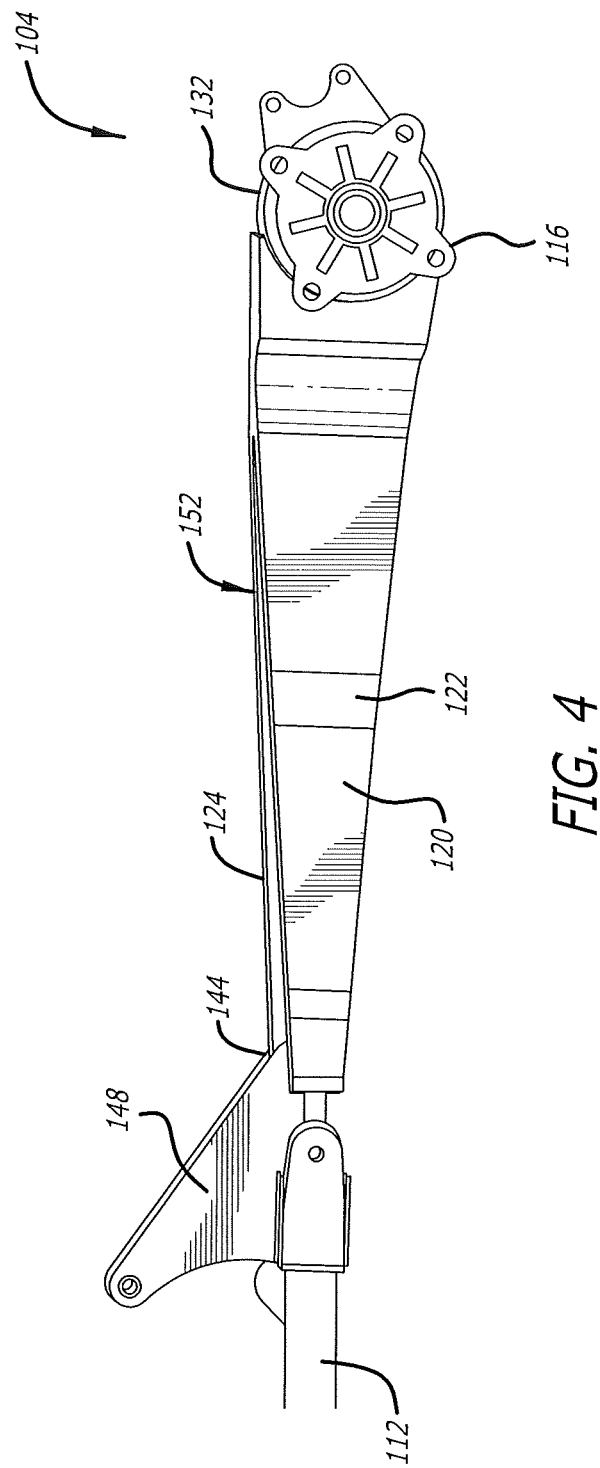
FIG. 4 is a side view illustrating an exemplary embodiment of a universal wishbone trailing arm coupled with a vehicle chassis in accordance with the present disclosure.
Figure 5:
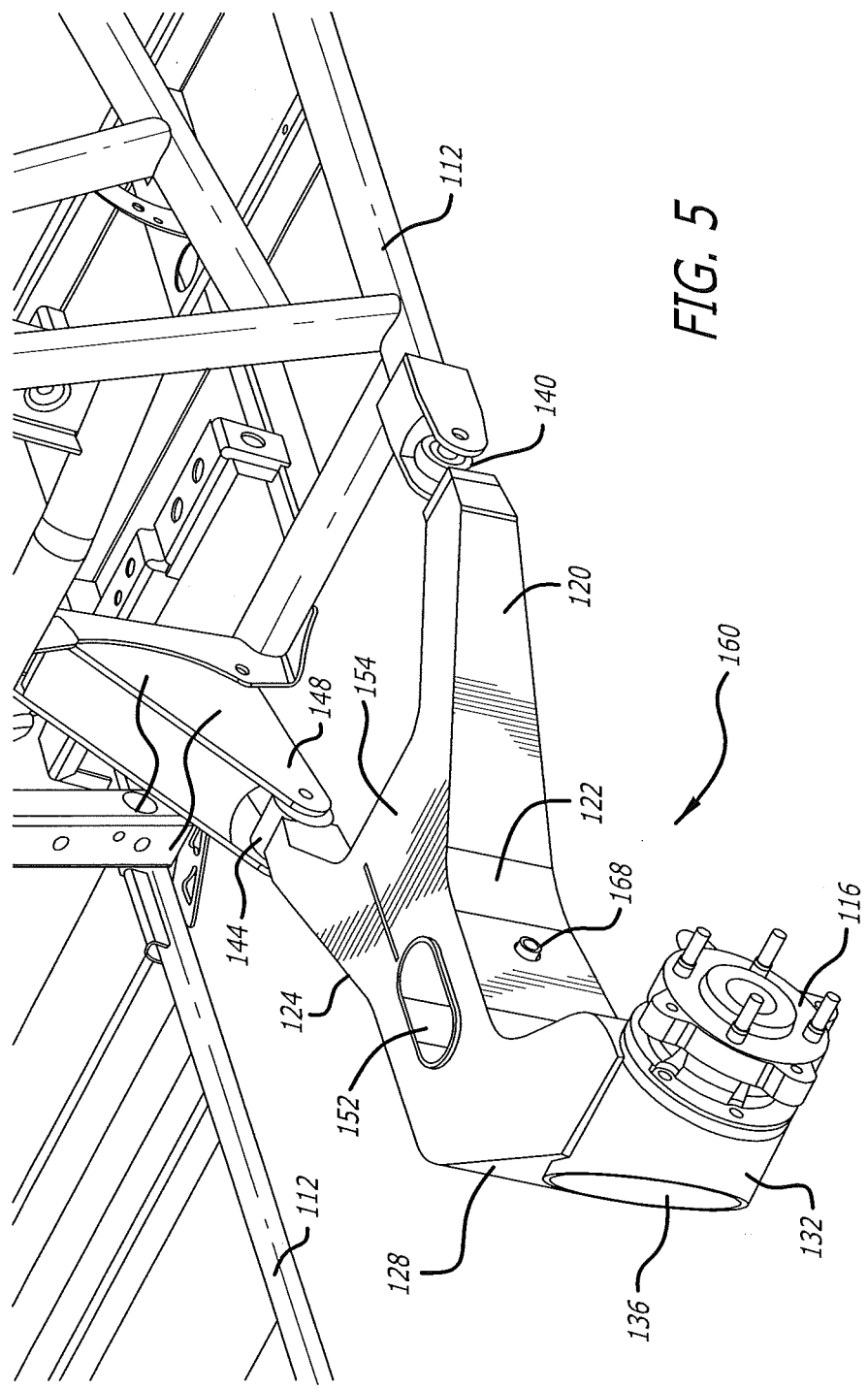
FIG. 5 is a perspective view illustrating an exemplary embodiment of a universal wishbone trailing arm coupled with a vehicle chassis in accordance with the present disclosure.
Figure 6:
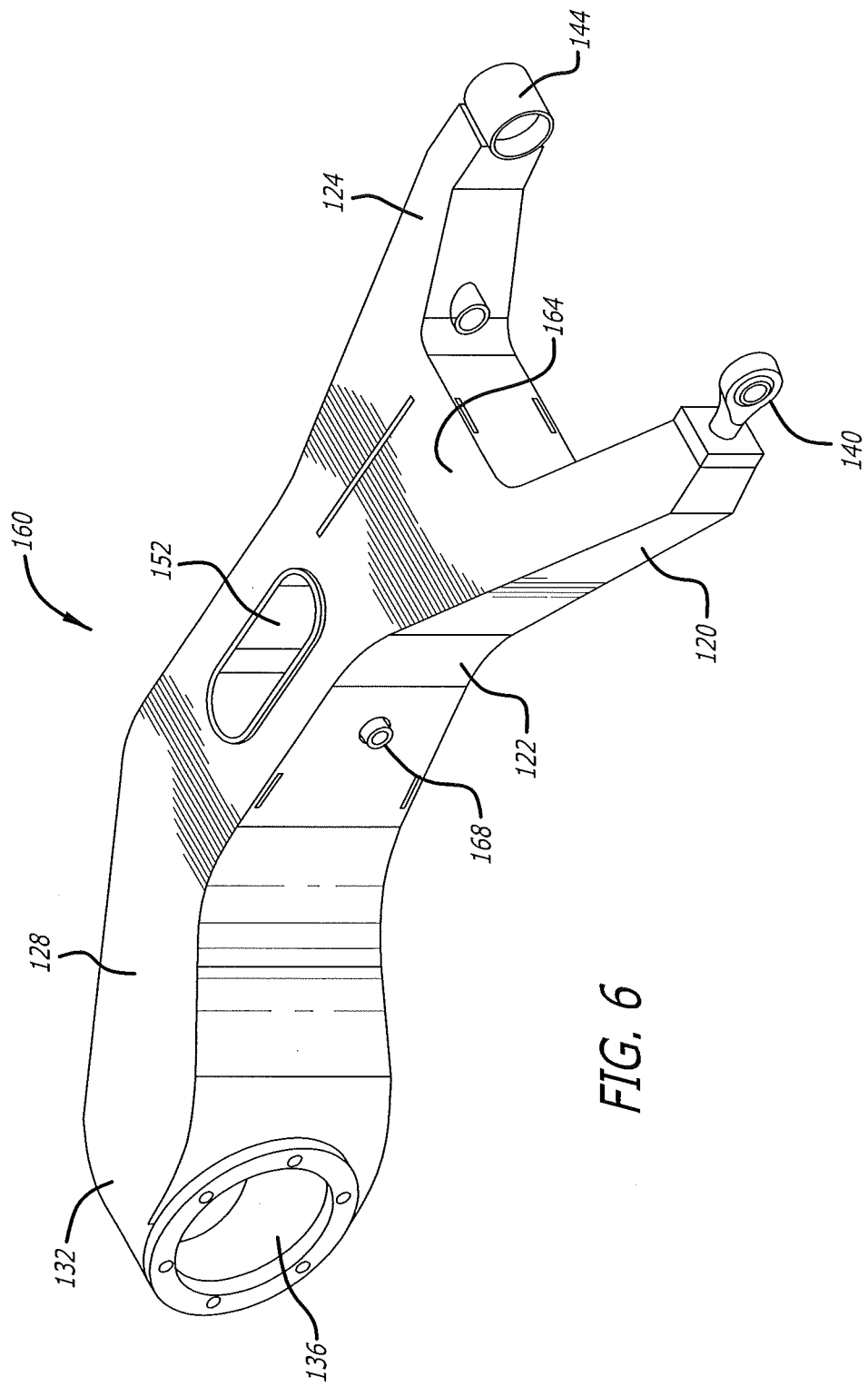
FIG. 6 illustrates an isometric view of the embodiment of the universal wishbone trailing arm illustrated in FIG. 5.

As best shown in FIG. 4, a centerline of the first and second swing arms 120, 124, and a centerline of the wheel hub 116 essentially define a flat plane. Thus, the universal trailing arm 104 is substantially symmetric above and below the flat plane. The symmetry of the universal trailing arm 104 facilitates interchangeability of the universal trailing arm between a driver side and a passenger side of the vehicle. Further, a recess 152 disposed between the first and second swing arms 120, 124 is particularly well suited for mounting a shock absorber. As will be appreciated, mounting the shock absorber within the recess 152 such that the mount is centered on the above-mentioned flat plane facilitates using substantially identical universal trailing arms 104 on the driver and passenger sides of the vehicle.

FIGS. 5-8 illustrate an exemplary embodiment of a universal trailing arm 160 that is substantially similar to the universal trailing arm 104 shown in FIG. 1-4. Upon comparing FIGS. 2 and 5, it will be recognized that the universal trailing arm 160 is comprised of first and second swing arms 120, 124, as well as the joined swing arm 128, that are relatively larger than the swing arms 120, 124, 128 comprising the universal trailing arm 104. Unlike the universal trailing arm 104, however, the universal trailing arm 160 is comprised of a structural portion 164, forward of the recess 152, that interconnects the first and second swing arms 120, 124. It is contemplated that the structural portion 164 generally improves the durability of the universal trailing arm 160, as well as substantially reducing any relative movement between the first swing arm 120 and the second swing arm 124 during travel over rough terrain.

Figure 7:
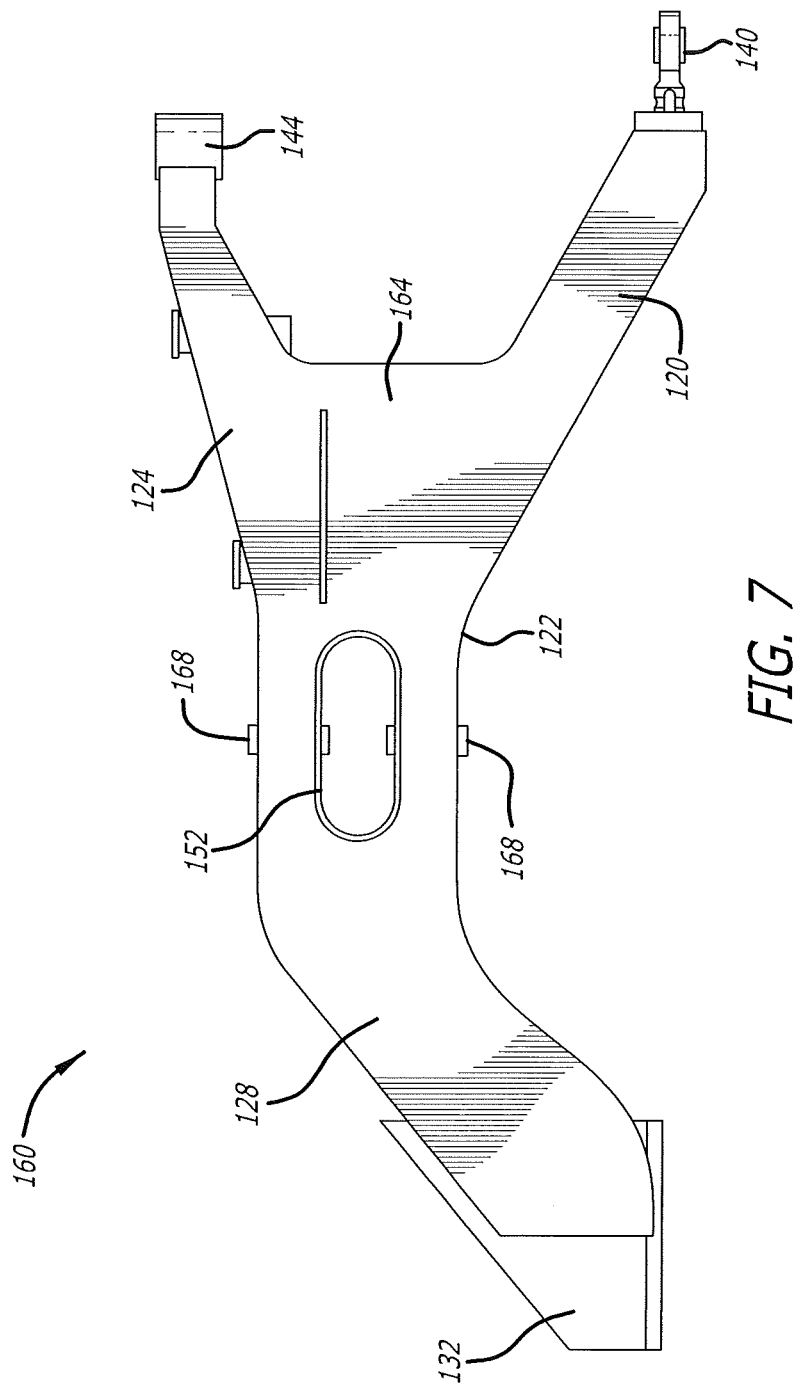
FIG. 7 illustrates a plan view of the embodiment of the universal wishbone trailing arm illustrated in FIG. 5.
Figure 8:
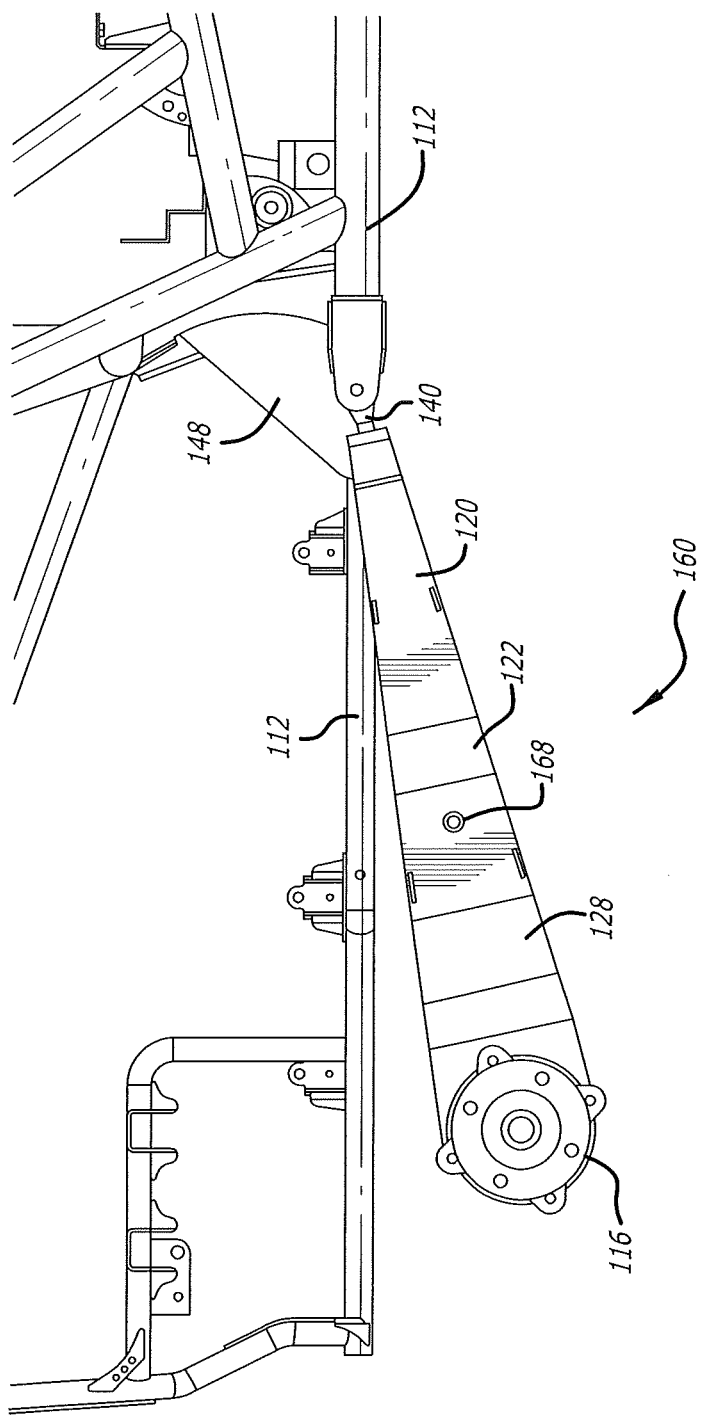
FIG. 8 is a side view illustrating the embodiment of the universal wishbone trailing arm of FIG. 5 coupled with the vehicle chassis in accordance with the present disclosure.

Moreover, it is contemplated that the structural portion 164 may provide relatively improved support to the portion of the universal trailing arm 160 surrounding the recess 152. As best illustrated in FIG. 7, a shock mount 168 is disposed within the first and second swing arms 120, 124 and configured to hingedly receive a suitable shock absorber or strut into the recess 152. As shown in FIG. 8, the shock mount 168 is centered on the above-mentioned flat plane, thereby facilitating mounting one or more shock absorbers either above or below the flat plane of the universal trailing arm 160. It should be understood, therefore, that centering the shock mount 168 on the flat plane facilitates implementing the universal trailing arms 160 on either the driver or passenger sides of the vehicle, as discussed herein.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A universal wishbone trailing arm for coupling a wheel to a vehicle chassis, comprising:
    a wheel hub configured to fastenably receive the wheel;
    a cylindrical axle support including one or more roller bearings whereby the wheel hub is rotatable;
    a first swing arm and a second swing arm extending forwardly from a joined swing arm, the cylindrical axle support being coupled to a rear of the joined swing arm;
    a first chassis mount configured to hingedly couple the first swing arm to the vehicle chassis; and
    a second chassis mount configured to hingedly couple the second swing arm to an articulated mount configured to couple the second swing arm to the vehicle chassis.

2. The trailing arm of claim 1, wherein the articulated mount is configured to cooperate with the first swing arm and the second swing arm so as to change a camber angle of the wheel, such that a tracking of the wheels remains substantially unchanged during traveling over rough terrain.

3. The trailing arm of claim 1, wherein a centerline of the first and second swing arms, and a centerline of the wheel hub define a flat plane, above and below which flat plane the universal trailing arm is substantially symmetric.

4. The trailing arm of claim 3, wherein the universal trailing arm is configured for use with either wheel in a rear suspension of a vehicle.

5. The trailing arm of claim 3, wherein the universal trailing arm is configured for use with either wheel in a front suspension of a vehicle.

6. The trailing arm of claim 1, wherein the cylindrical axle support is configured to receive a constant velocity (CV) joint coupled to the wheel hub so as to communicate engine-torque to the wheel.

7. The trailing arm of claim 6, wherein the cylindrical axle support is configured to shield the CV joint from damage due to rocks and road debris encountered during off-road driving.

8. The trailing arm of claim 1, wherein the first swing arm comprises a curved portion to provide clearance between the first swing arm and a sidewall width of the wheel.

9. The trailing arm of claim 1, wherein the first and second chassis mounts are configured to allow the wheel to undergo a substantially vertical motion in response to the terrain over which the wheel is rolling while diminishing a transfer of the vertical motion to the vehicle.

10. The trailing arm of claim 9, wherein one or more shock absorbers are coupled with the universal wishbone trailing arm so as to further diminish the vertical motion conveyed to the vehicle due to terrain.

11. The trailing arm of claim 10, wherein the one or more shock absorbers are mounted within a recess disposed between the first and second swing arms, and along a midline of the universal wishbone trailing arm, such that substantially identical universal trailing arms may be used on a driver side and a passenger side of the vehicle.

12. A universal wishbone trailing arm for coupling a wheel to a vehicle chassis, comprising:
   a first swing arm and a second swing arm extending forwardly from a joined swing arm;
   a cylindrical axle support coupled to a rear of the joined swing arm; and
   a wheel hub rotatably supported within the cylindrical axle support.

13. The trailing arm of claim 12, wherein the first swing arm is further comprised of a first chassis mount configured to hingedly couple to the vehicle chassis.

14. The trailing arm of claim 12, wherein the second swing arm is further comprised of a second chassis mount configured to hingedly couple to an articulated mount that is coupled to the vehicle chassis.

15. The trailing arm of claim 14, wherein the articulated mount is configured to cooperate with the first swing arm and the second swing arm so as to change a camber angle of the wheel, such that a tracking of the wheels remains substantially unchanged during traveling over rough terrain.

16. A method for a wishbone trailing arm for coupling a wheel to a vehicle chassis, comprising:
   fabricating a swing arm comprised of a forwardly extending first swing arm and a forwardly extending second swing arm;
   coupling a cylindrical axle support to a rear of the swing arm; and
   supporting a wheel hub rotatably within the cylindrical axle support.

17. The method of claim 16, wherein fabricating comprises configuring a first chassis mount to hingedly couple the first swing arm to the vehicle chassis, and wherein fabricating further comprises configuring a second chassis mount to hingedly couple the second swing arm to an articulated mount that is coupled with the vehicle chassis so as to maintain a tracking of the wheels during traveling over rough terrain.

18. The method of claim 16, wherein supporting comprises configuring the cylindrical axle support to receive a constant velocity (CV) joint that is coupled to the wheel hub so as to communicate engine-torque to the wheel, the cylindrical axle support being further configured to shield the CV joint from damage due to rocks and road debris encountered during off-road driving.

19. The method of claim 16, wherein fabricating further comprises disposing a recess between the first swing arm and the second swing arm, the recess extending along a midline of the wishbone trailing arm, such that one or more shock absorbers may be mounted within the recess and coupled with the vehicle chassis.

* * * * *